United States Patent

Goodwin, III

[11] Patent Number: 6,044,359
[45] Date of Patent: Mar. 28, 2000

[54] METHOD OF MINIMIZING POWER CONSUMPTION WITHIN AN ELECTRONIC PRICE LABEL

[75] Inventor: John C. Goodwin, III, Suwanee, Ga.

[73] Assignee: NCR Corporation, Dayton, Ohio

[21] Appl. No.: 08/969,912

[22] Filed: Nov. 13, 1997

[51] Int. Cl.$^7$ .................................................. G06F 17/60
[52] U.S. Cl. .................. 705/20; 705/1; 705/20; 705/400; 235/383; 235/385; 340/825.35; 340/825.36; 340/285.47; 345/329; 362/125
[58] Field of Search .................. 705/20, 1, 400; 326/93; 340/825, 825.35, 825.36; 235/383, 385; 345/329; 362/125

[56] References Cited

U.S. PATENT DOCUMENTS

| | | | |
|---|---|---|---|
| 4,002,886 | 1/1977 | Sundelin | 235/383 |
| 4,500,880 | 2/1985 | Gomersall et al. | 340/825.35 |
| 4,924,363 | 5/1990 | Kornelson | 362/125 |
| 5,172,314 | 12/1992 | Poland et al. | 705/20 |
| 5,248,905 | 9/1993 | Kuo | 326/104 |
| 5,448,226 | 9/1995 | Failing, Jr. et al. | 340/825.35 |
| 5,504,475 | 4/1996 | Houdou et al. | 340/825.35 |
| 5,510,602 | 4/1996 | Evans et al. | 235/385 |
| 5,539,393 | 7/1996 | Barfod | 340/825.35 |
| 5,544,041 | 8/1996 | Nekomoto | 705/1 |
| 5,797,132 | 8/1998 | Altwasser | 705/20 |
| 5,870,714 | 2/1999 | Shetty et al. | 705/20 |

FOREIGN PATENT DOCUMENTS

| | | |
|---|---|---|
| 9216901 | 10/1992 | WIPO . |
| 9411833 | 5/1994 | WIPO . |
| 9411834 | 5/1994 | WIPO . |

*Primary Examiner*—James P. Trammell
*Assistant Examiner*—Nga B. Nguyen
*Attorney, Agent, or Firm*—Paul W. Martin; Peter H. Priest

[57] ABSTRACT

A method of minimizing power consumption within an electronic price label (EPL) which conserves battery life. A time period for removing power from a transceiver within the EPL is determined by a computer from price change frequency data. A message to control circuitry within the EPL is sent by the computer as soon as possible following a change in price displayed by the EPL. The message includes a command to remove power from the transceiver and the power down time period. Power is removed from the transceiver by the control circuitry. The control circuitry counts until the power down time period is exhausted. Power is applied to the transceiver by the control circuitry when the power down time period is exhausted. Finally, a first time within the control circuitry is synchronized by the control circuitry to a second time indicated by the computer after the power down timer period is exhausted and before any additional message is sent to the EPL.

12 Claims, 2 Drawing Sheets

6,044,359

METHOD OF MINIMIZING POWER CONSUMPTION WITHIN AN ELECTRONIC PRICE LABEL

BACKGROUND OF THE INVENTION

The present invention relates to electronic price label (EPL) systems, and more specifically to a method of minimizing power consumption within an EPL.

EPL systems typically include a plurality of EPLs for each merchandise item in a store. EPLs include displays which display the price of corresponding merchandise items on store shelves and are typically attached to a rail along the leading edge of the shelves. EPL systems typically obtain their prices from the POS server's PLU file. A store may contain thousands of EPLs to display the prices of the merchandise items. The EPLs are coupled to a central server from where information about the EPLs is typically maintained in an EPL data file. The EPL data file contains EPL identification information, and EPL merchandise item information.

EPLs are typically powered by batteries. The current expected life of an EPL battery is about 5–7 years. Receiving circuitry draws most of the power, even though operation of the receiving circuitry is only required during transmission of messages from the central server.

Various methods of saving EPL battery life are disclosed in European Patents Nos. WO 9411834 and WO 9411833. A monitoring module automatically senses a power drop from the main source of power (a solar panel) to initiate a power saving mode of operation. After an operating time t, the monitoring module removes power from high power components for a time n*t.

However, inclusion of a separate monitoring module adds cost to an EPL. The cost is significant to an installation involving thousands of EPLS. Also, requiring that all EPLs sleep after an interval t for a period n*t is inconsistent with the system utilization. An EPL system can track and anticipate when communications (e.g., price changes) need to occur. The system's ability to anticipate allows it to improve throughput because the EPLs are ready when needed. Additionally, if anticipation is done correctly, EPLs could be made to sleep longer, thus prolonging their battery lives. For example, if a retailer only makes price changes at night between midnight and six o'clock a.m., then the EPLs can actually sleep for eighteen hours per day.

Therefore, it would be desirable to provide a method of minimizing power consumption within an EPL that minimizes the cost of the EPL.

SUMMARY OF THE INVENTION

In accordance with the teachings of the present invention, a method of minimizing power consumption within an EPL is provided.

The method includes the steps of sending a message to control circuitry within the EPL including a command to remove power from predetermined components within the EPL and a power down time period by a computer, removing power from the predetermined components by the control circuitry, counting by the control circuitry until the power down time period is exhausted, and applying power to the predetermined components when the power down time period is exhausted.

The method may additionally include the step of determining the time period for removing power from the predetermined components from price change frequency data.

The method may additionally include the step of synchronizing a first time within the control circuitry to a second time indicated by the computer by the control circuitry after the power down timer period is exhausted and before any additional message is sent to the EPL.

The method targets a transceiver within the EPL as the largest consumer of power, although power may be removed from other components.

The method preferably removes power as soon as possible following a change in price displayed by the EPL.

It is accordingly an object of the present invention to provide a method of minimizing power consumption within an EPL.

It is another object of the present invention to provide a method of minimizing power consumption within an EPL which minimizes the cost of the EPL.

It is another object of the present invention to provide a method of minimizing power consumption within an EPL which shuts down components associated with the message receive function.

It is another object of the present invention to provide a method of minimizing power consumption within an EPL which increases battery life to at least 7–10 years.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
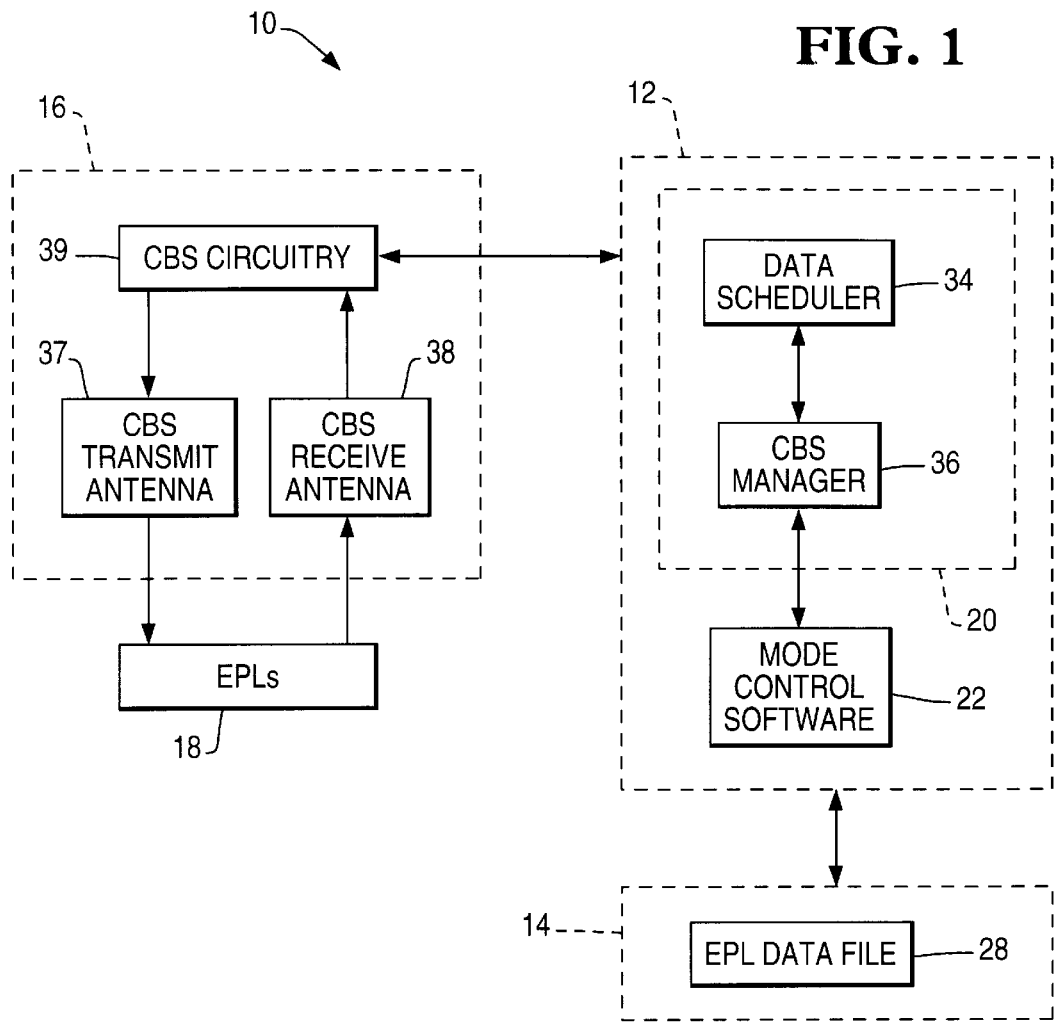
FIG. 1 is a block diagram of an EPL system.

Referring now to FIG. 1, EPL system 10 includes computer 12, storage medium 14, communication base station (CBS) 16, and electronic price labels (EPLs) 18.

Computer 12 executes EPL control software 20 and mode control software 22. EPL control software 20 records, schedules, and transmits all messages to EPLs 18 through CBS 16, and receives and analyzes messages from EPLs 18 through CBS 16.

EPL control software 20 maintains and uses EPL data file 28. EPL data file 28 contains item information, EPL identification information, and status information for each of EPLs 18.

EPL control software 20 primarily includes data scheduler 34 and CBS manager 36. Data scheduler 34 schedules EPL price change messages to be sent to EPLs 18 through CBS 16. Data scheduler 34 schedules polling and EPL computer acknowledgment messages to be sent to device 24 through CBS 16.

CBS manager 36 controls transmission of price change messages and polling messages to EPLs 18. CBS manager 36 controls reception of status and acknowledgment messages from EPLs 18.

Mode control software 22 causes EPL control software 20 to schedule and transmit a mode control message to one or more of EPLs 18. The mode control message causes an EPL to remove power from predetermined components for a predetermined time period. Mode control messages are preferably scheduled and sent in batches.

Storage medium 14 is preferably a fixed disk drive. Storage medium 14 stores EPL data file 28.

CBS 16 preferably includes one transmit antenna 37 and up to four receive antennas 38 for transmitting and receiving messages between CBS 16 and EPLs 18. CBS 16 includes CBS circuitry 39 which controls operation of CBS 16. EPL system 10 preferably includes a plurality of CBSs 16 connected together in series.

Figure 2:
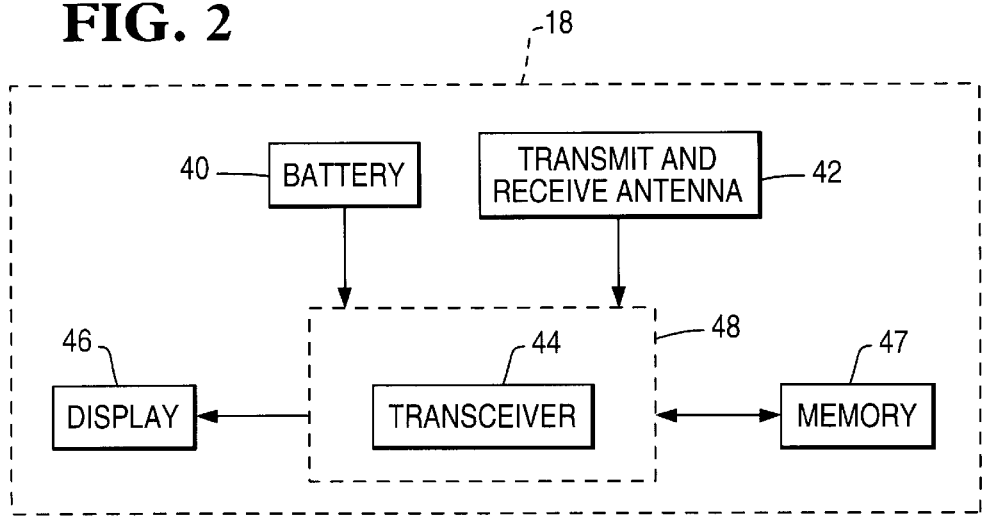
FIG. 2 is a block diagram of an EPL.

Turning now to FIG. 2, EPLs 18 each include battery 40, transmit and receive antenna 42, display 46, memory 47, and EPL circuitry 48.

Battery 40 provides power to EPLs 18.

Transmit and receive antenna 42 receives price change and status messages from CBS 16. Transmit and receive antenna 42 transmits responses in the form of acknowledgments to price change and status messages to CBS 16.

Display 46 displays price and possibly additional information. Display 46 is preferably a liquid crystal display (LCD).

Memory 47 stores price verifier information, EPL type information, and may additionally store promotional information. Memory 47 also stores the power removal time.

EPL circuitry 48 controls the internal operation of EPLs 18. EPL circuitry 48 receives messages from EPL computer 12 and transmits response messages to EPL computer 12. EPL circuitry 48 controls display of price and other information, including blinking.

Under the method of the present invention, EPL circuitry 48 also implements a power saving mode in response to a mode control message from EPL computer 12 by removing power for a predetermined time from components that consume more power than other components. Preferably, transceiver 44 is the main component. Removing power from its amplifier, RF filters, transistors, and resistors provides enough power savings to extend battery life to seven to ten years.

Historical price change frequency data and currently scheduled price change frequency data are used to determine the amount of sleep time. Retailers and installers may also recommend a default time period. Although, each EPL may be assigned its own individual time period.

For example, EPL circuitry 48 includes transceiver 44. EPL circuitry 48 removes power from transceiver 44.

EPL circuitry 48 may optionally include an alternate communications channel which may be employed to communicate with an EPL 18. Functions that may be implemented using this channel may include blinking displayed information and activating an alternative display mode.

Figure 3:
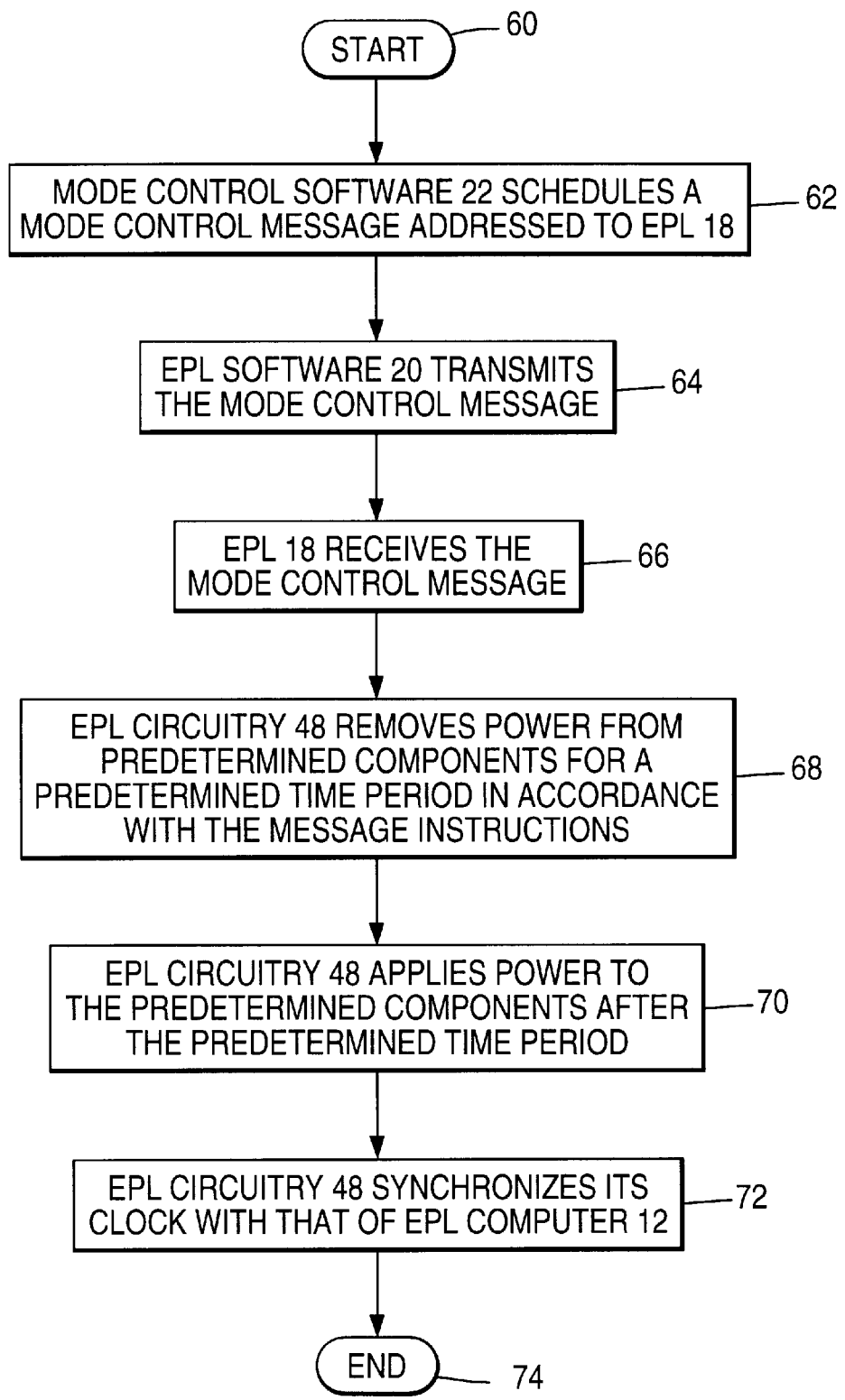
FIG. 3 is a flow diagram illustrating the power saving method of the present invention.

Turning now to FIG. 3, the operation of system 10 in accordance with the method of the present invention is illustrated in more detail, beginning with START 60.

In step 62, mode control software 22 schedules a mode control message addressed to EPL 18, preferably as soon as possible following a verified price change.

In step 64, EPL software 20 transmits the mode control message. The message may include an EPL identification number if it is addressed to an individual EPL or a global address if it is addressed to all EPLs. The message additionally includes a power down time period. EPL circuitry 48 applies power after the power down time period has expired. For example, the message may instruct the EPL start counting at power down and reapply power when it reaches a predetermined count. The count may be equal to a number of seconds or a predetermined number of some time measure that is a function of seconds.

In step 66, EPL 18 receives the mode control message.

In step 68, EPL circuitry 48 removes power from predetermined components for a predetermined time period in accordance with the message instructions.

In step 70, EPL circuitry 48 applies power to the predetermined components after the predetermined time period.

In step 72, EPL circuitry 48 synchronizes its clock with that of EPL computer 12. This step is preferably performed as soon as possible following application of power, and preferably before additional messages are sent to EPL 18.

Operation ends in step 74 to resume operation with all components powered.

Although the present invention has been described with particular reference to certain preferred embodiments thereof, variations and modifications of the present invention can be effected within the spirit and scope of the following claims.

What is claimed is:

1. A method of minimizing power consumption by an electronic price label (EPL) comprising:

sending a message to control circuitry within the EPL, which includes a command to remove power from predetermined components within the EPL and a power down time period, by a remote computer;

removing power from the predetermined components by the control circuitry in response to the sent message;

counting by the control circuitry until the power down time period is exhausted;

applying power to the predetermined components when the power down time period is exhausted; and determining the time period for removing power from the predetermined components from price change frequency data.

2. The method as recited in claim 1, further comprising the step of:

synchronizing a first time within the control circuitry to a second time indicated by the computer by the control circuitry after the power down timer period is exhausted and before any additional message is sent to the EPL.

3. The method as recited in claim 1, wherein the predetermined components include a transceiver within the EPL.

4. The method as recited in claim 1, wherein the step of sending comprises the step of:

scheduling the message as soon as possible following a change in price displayed by the EPL.

5. The method of claim 1 further comprising the steps of:

scheduling a price change message for the EPL using a data scheduler which synchronizes the price change message to a period when power is being applied to the predetermined components of the EPL.

6. The method of claim 1 wherein said method is applied to a plurality of EPLs in a store EPL system further comprising the steps of:

scheduling mode control messages which include a command to remove power from predetermined components within the plurality of EPLs in batches; and sending said mode control messages in batches.

7. The method of claim 1 further comprising the step of:

storing the power down time period in a memory in the EPL.

8. The method of claim 6 wherein said mode control messages include an EPL identification if addressed to individual EPLs or a global address if addressed to all EPLs.

9. A method of minimizing power consumption by an electronic price label (EPL) comprising:

determining a time period for removing power from a transceiver within the EPL from price change frequency data by a remote computer;

sending a message to control circuitry within the EPL by the remote computer as soon as possible following a change in price display by the EPL, wherein the message includes a command to remove power from the transceiver and the power down time period;

removing power from the transceiver by the control circuitry in response to the sent message;

counting by the control circuitry until the power down time period is exhausted;

applying power to the transceiver when the power down time period is exhausted; and synchronizing a first time within the control circuitry to a second time indicated by the remote computer by the control circuitry after the power down timer period is exhausted and before any additional message is sent to the EPL.

10. A low power electronic price label system comprising:

a plurality of electronic price labels (EPLs);

a remote computer for selectively sending mode control messages to control circuitry within the EPLs, said mode control messages including a command to remove power from predetermined components within the EPLs and a power down time period;

the control circuitry within each of the EPLs being operable to remove power from the predetermined components upon receipt of a mode control message, to determine that the power down period has passed, and to reapply power to the predetermined components after the power down period has passed;

wherein the remote computer determines the power down time period based upon an analysis of price change frequency data for the EPLs.

11. The system of claim 10 wherein said remote computer further comprises a data scheduler for scheduling EPL price change messages during periods when the predetermined components are being supplied with power.

12. The system of claim 10 wherein each EPL further comprises a memory for storing the power down time period.

* * * * *